United States Patent
Gebhart et al.

(10) Patent No.: US 11,341,094 B2
(45) Date of Patent: May 24, 2022

(54) INTELLIGENT CLOUD OPERATIONS

(71) Applicant: SAP SE, Walldorf (DE)

(72) Inventors: Alexander Gebhart, Ubstadt-Weiher (DE); Clemens Daeschle, Neckarsteinach (DE)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 16/867,851

(22) Filed: May 6, 2020

(65) Prior Publication Data

US 2021/0349851 A1    Nov. 11, 2021

(51) Int. Cl.
| | |
|---|---|
| *G06F 16/14* | (2019.01) |
| *G06F 16/17* | (2019.01) |
| *G06N 3/04* | (2006.01) |
| *G06Q 30/02* | (2012.01) |
| *G06F 16/182* | (2019.01) |

(52) U.S. Cl.
CPC ........ *G06F 16/144* (2019.01); *G06F 16/1734* (2019.01); *G06F 16/182* (2019.01); *G06N 3/04* (2013.01); *G06Q 30/0206* (2013.01)

(58) Field of Classification Search
CPC .......... G06N 20/00; G06N 3/02; G06F 40/40; G06F 16/1744; G06F 16/285
See application file for complete search history.

(56) References Cited

U.S. PATENT DOCUMENTS

| | | | |
|---|---|---|---|
| 10,712,738 B2 * | 7/2020 | Cella | G05B 13/028 |
| 2016/0321536 A1 * | 11/2016 | Ponomarev | H04J 11/00 |
| 2017/0041296 A1 * | 2/2017 | Ford | G06F 16/951 |

* cited by examiner

*Primary Examiner* — Angelica Ruiz
(74) *Attorney, Agent, or Firm* — Fountainhead Law Group P.C.

(57) ABSTRACT

Embodiments control software hosted by cloud providers and private clouds. Operational data received from the software correlates: •a time, •a user at the time, and •a software component accessed by the user at the time. The operational data relates to resources (e.g., storage, computational, network) that are consumed. Experiential data characterizing a quality of user interaction, is also received. The experiential data may be derived from operational data (e.g., inferred from time lags), or received separately as feedback. Operational data and experiential data are processed according to a ruleset or a neural network. Based upon the result, which optimizes towards costs, experience data (e.g., time lags) or policies (e.g. security constraints), a command causes an actuator to act upon the software. The actuator may trigger movement to a different host (e.g. different cloud provider). The move functionality, if applied to many customers at once, embodies a cloud provider switch service.

18 Claims, 6 Drawing Sheets

INTELLIGENT CLOUD OPERATIONS

BACKGROUND

Unless otherwise indicated herein, the approaches described in this section are not prior art to the claims in this application and are not admitted to be prior art by inclusion in this section.

The complexity and size of software solutions is expanding over time. This expansion is driven by trends such as: Big Data, the Internet of Things (IoT), Machine Learning (ML), and Artificial Intelligence (AI).

Operation of these larger and more complex software systems in turn leads to higher costs, as well as the consumption of a larger carbon footprint. Due to the cloud computing paradigm, these costs and carbon footprint may be generally visible. This visibility in turn imposes pressure upon organizations to strive for minimal cost and a low carbon footprint in running their software solutions.

SUMMARY

Embodiments relate to methods and apparatuses implementing intelligent control over software programs being hosted by remote cloud providers and private clouds. Operational data is received from the software program. The operational data correlates the following: •a time, •a user at the time, and •a software component accessed by the user at the time. The operational data describes infrastructure resources (e.g., storage, computational, network) consumed at the host cloud provider by the software program. Experiential data characterizing a quality of a user interaction with the software program, is also received. The experiential data may be derived from operational data (e.g., time lags), or may be separately received as user feedback (e.g., in response to an explicit question). The operational data and the experiential data are evaluated, and as a result a command is issued to cause an actuator to perform an action upon the software.

The evaluation can be done in a static, pre-defined way—e.g., by processing according to a specific ruleset. The evaluation can also be done in a dynamic way—e.g., by using a self-learning neural network (AI). Both evaluation methods can be combined, and use the cost value and the experience value as an optimization goal.

Where the operational and/or experiential data indicate a reduced demand for software components, some embodiments may find particular value in reducing software activity and hence consumption of resources at the host provider.

Where market values of resources available from an exchange of host providers is received, embodiments may trigger movement of the software to a lower-cost host provider to reduce expense. Such software migration can adopt principles akin to High Availability (HA) techniques, wherein continued access to software is ensured even in the face of the failure of some system elements.

Such HA techniques may ensure a zero-downtime software movement between different host providers. In some cases, the movement to a different host provider can also be triggered by experience data—such as time lags. In some embodiments, a decision to move to a different host provider, may be based upon policy considerations, including but not limited to security constraints, or compliance issues. If the Intelligent Cloud Operations software is applying the move functionality to many customers at once, it embodies a cloud provider switch service.

The following detailed description and accompanying drawings provide a better understanding of the nature and advantages of various embodiments.

DETAILED DESCRIPTION

Described herein are methods and apparatuses that implement intelligent control over software solutions hosted by a cloud provider or within a private cloud. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
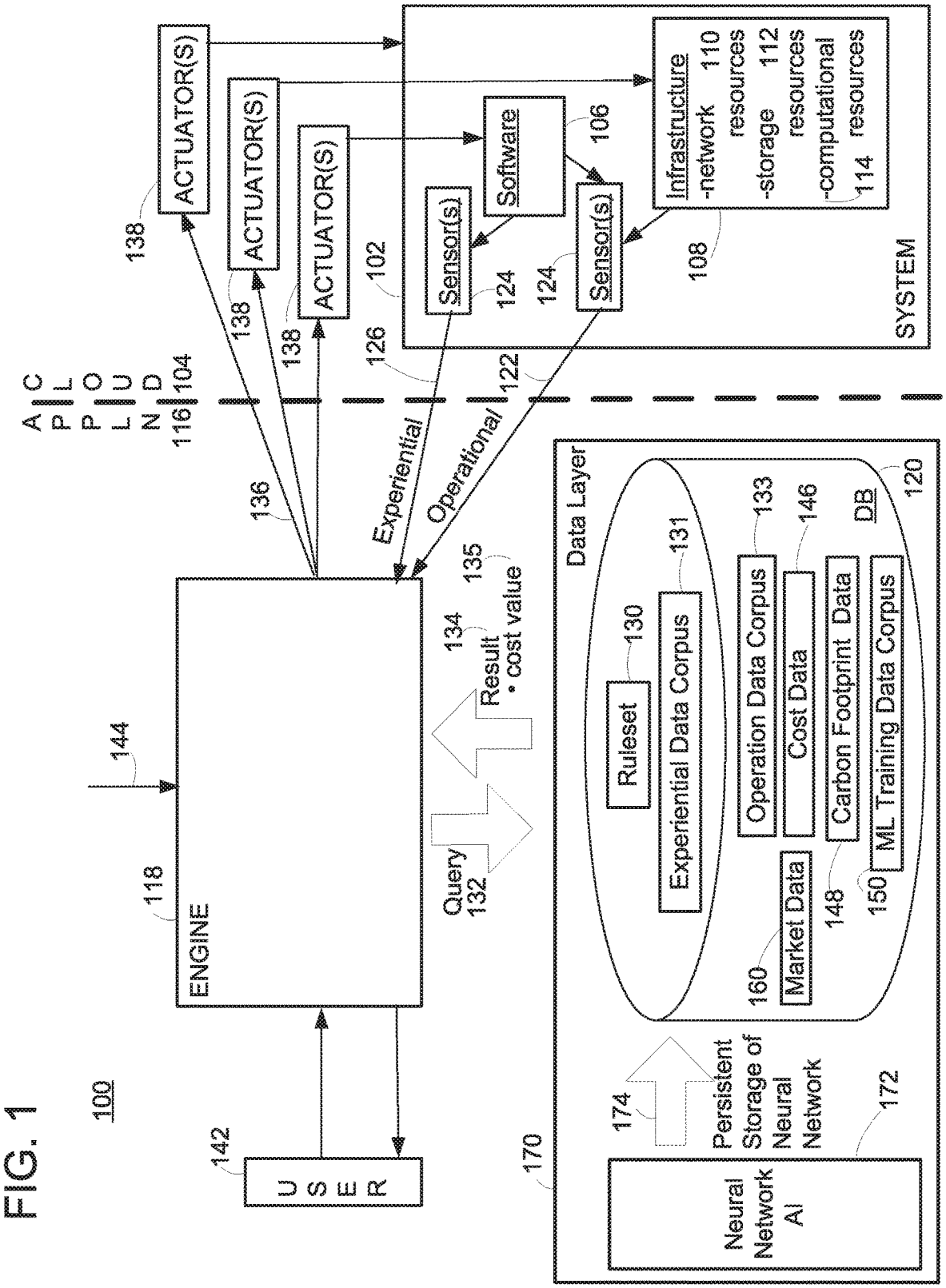
FIG. 1 shows a simplified diagram of a system according to an embodiment.

FIG. 1 shows a simplified view of an embodiment that is configured to implement intelligent control over cloud systems. Specifically, environment 100 comprises a cloud system 102 located on a cloud side 104.

The cloud system hosts the operation of a software program 106. That software program consumes available resources provided by an infrastructure 108 of the cloud system. Examples of such resources can include network resources 110, storage resources 112, and computational resources 114.

As described herein, an intelligent control application side 116 includes a processing engine 118 and a data layer 170. The data layer comprises a database 120 and a neural network Artificial Intelligence (AI) 172.

While FIG. 1 shows the application as located outside of the cloud layer (e.g., on-premises with the user), this is not required. According to alternative embodiments, the application 116 could also be present in the cloud.

The processing engine is configured to receive various inputs. One input is operational data 122 of the software program. The operational data includes the following:

Time. An indication of a time of access of a component of the software by a particular user of the cloud-hosted software.

Software User. An identifier of the particular user of the cloud-hosted software.

Software Component. The software component (e.g., functionality, module) being accessed by the user at the time.

Such operational data can be collected by sensor(s) 124—e.g., that are in communication with the various resources of the infrastructure, the software program itself, and/or the overall cloud provider system. A log is one example of such a sensor.

A second input to the processing engine, is experiential 126 data from the software program. Such experiential data reflects the quality of the interaction between the cloud-hosted software program, and individual users thereof. As described further below in connection with the example, in some circumstances the experiential data can represent actual user feedback (e.g., responses to explicit questions regarding satisfaction with the cloud-hosted software).

However, it is also noted that experiential data can also be derived from operational data. One example is a failure by a software user to actually employ the software once it is accessed. This could, e.g., reflect frustration by the user with excessive lag time to in fact gain access.

The processing engine stores in the database, the received experiential data as part of a data corpus 131 and the operational data as part of a data corpus 133. Then, the processing engine issues a query 132 to the data stored in the data layer to return a relevant query result 134 including a cost value 135. The cost value represents a cost of operation of the system—e.g., in a current state, or in a changed state resulting from possible actuation (see below).

The nature of the interaction between the processing engine and the data layer may take one or more forms. One approach references the data stored in the database according to the static ruleset. This may be sufficient for exercising intelligent control over stable systems exhibiting a known set of behaviors, e.g.: a work environment having strict office hours each day from 9 am-5 pm, with no work allowed on holidays or weekends).

Other systems that are to be intelligently controlled, however, may exhibit a range of behaviors that are not completely known. Accordingly, certain embodiments may exercise control over such systems using the neural network AI component in conjunction with the database and/or ruleset.

According to the neural network (AI) based approach, the data is stored within the neural network. The neural network is a computer program, of which only the persistent parts are stored in a traditional database.

These persistent parts of the neural network AI are just used for the initial start of the neural network. This is shown in FIG. 1 by the arrow 174.

Thus for customers having a dynamic business, a static ruleset could become too complex to catch every exception. For such cases, a self-learning neural network AI may be better suited.

Based upon the query result (including the cost value) and the ruleset and/or the neural network, the processing engine issues a command 136 to an actuator 138, to take an action changing a state of the cloud system. In a highly simplified example, the command could be for the actuator to suspend operation of the software or a portion (e.g., specific functionality, component) thereof. Such an action could be useful, for example, where the query result reveals a usage pattern that is expected to be light (e.g., the middle of the night, a weekend, holiday, or even scheduled vacation time of a particular user of a particular component of the cloud-hosted software).

It is noted that the action taken, may depend upon factors other than cost. For example, certain embodiments may consider policies such as security concerns and/or compliance issues in deciding to take an action.

Depending upon the result of processing the inputs according to the ruleset, the processing engine may issue a variety of different commands for action to be taken on the software by the cloud system. Examples of such actions can include but are not limited to:

start up,
shut down,
suspend (e.g., not consuming resources, but affording rapid re-access),
restart (e.g., affording less rapid re-access, but allowing installation of periodic updates),
shrink,
expand,
install,
deinstall, and
move to another cloud provider.

It is noted that the processing engine may receive inputs from other than the cloud system. And, those other inputs may further be considered in generating the output command to an actuator.

For example, the processing engine may receive instructions 140 from the user 142 of the intelligent cloud management application, to handle operations in a particular manner. These instructions could establish preferences of individual users (e.g., of the cloud-hosted software, or of the intelligent cloud control application).

The processing engine may receive additional input 144 from an outside data source. One example of such data, could be the market value of cloud computer resources as are offered in an exchange. Thus, a variety of different providers of cloud services (e.g., storage, network, and computational resources) could offer to sell their capacities as available over various time frames, at prices determined by a market structure. Such market data 160 could be stored in the database.

According to another example, a data source that communicates input could be the user of the hosted software program. Thus under certain circumstances received instructions may include specific reservation(s) to ensure that the software program is afforded sufficient resources by the hosting provider in order to support use over a given time period, e.g.:

User Z has an upcoming deadline and so software component M must be fully available over the upcoming weekend,
or conversely,
User Z has scheduled vacation over the upcoming week, and so it is acceptable for software component M to exhibit reduced availability over that time period.

While FIG. 1 shows the storage of operational data and experiential data corpuses, a variety of other data types could be referenced as part of intelligent cloud control. For example cost data 146 (e.g., as received from an exchange for cloud provider services) could be stored in the database.

Also capable of storage according to embodiments, is carbon footprint data 148. Such carbon footprint data could be referenced by the processing engine to determine an action to be taken in terms of consumption of fossil fuel resources. This could include the consumption of electricity for data storage, networking, processing etc. Such carbon footprint data could even form the basis for an exchange of carbon credits amongst different software systems.

Still other types of data that may be stored in the database and referenced to implement action on the cloud system. For example, certain embodiments may employ machine learning as part of the processing that is performed. Thus, the database may further store corpus(es) of training data 150 for use in that process of machine learning.

Figure 2:
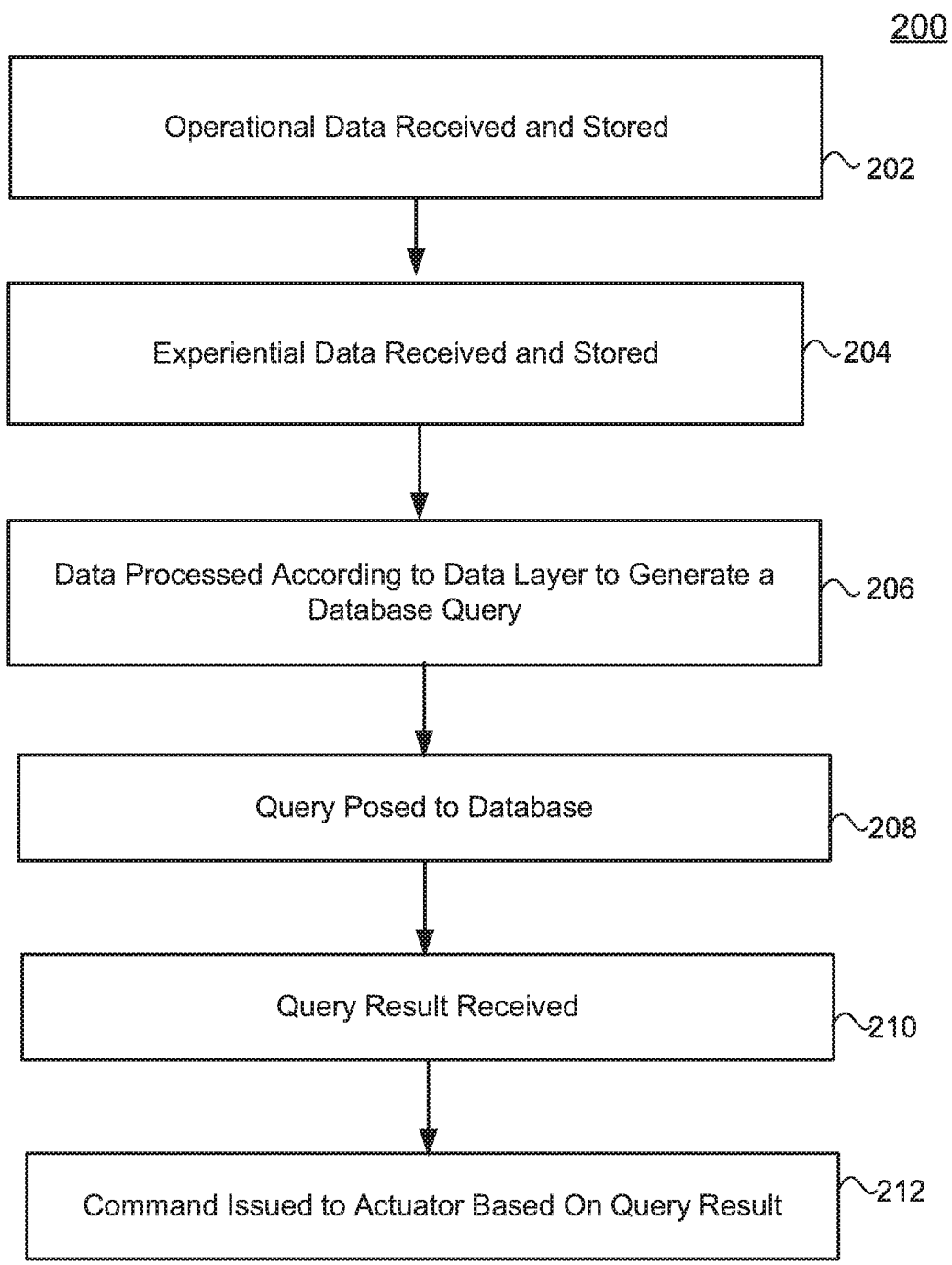
FIG. 2 shows a simplified flow diagram of a method according to an embodiment.

FIG. 2 is a flow diagram of a method 200 according to an embodiment. At 202, operational data (including time, user, and software component data) is received and stored.

At 204, experiential data is received and stored. At 206, the operational data and the experiential data are processed with reference to a data layer (e.g., ruleset and/or neural network AI), to generate a query.

At 208 the query is issued to the data layer. At 210, a query result is received including a cost value.

At 212, based upon the query result an actuator is commanded to act upon the software.

Embodiments as described herein may offer certain benefits over other approaches. One possible benefit is to avoid vendor "lock in", wherein a particular software solution is inextricably bound to a specific cloud provider. Such vendor lock in can result in greater expense (e.g., where a different cloud provider could provide resources at a lower market cost). Data security issues and lack of flexibility can also adversely result where a software solution is "locked-in" to relying upon one particular cloud provider.

Further details regarding operation of a cloud system according to embodiments, are now provided in connection with the following example.

Example

A variety of data analytics applications are available from SAP SE of Walldorf, Germany. These analytics applications may be run off-premises, utilizing (computational, storage, network) resources made available by a cloud provider.

Specific tools that may be useful for implementing control over cloud applications can include but are not limited to SAP Landscape Management (LaMa), SAP SPC (Service Provider Cockpit), SAP Cloud Platform (SCP), and Docker/Kubernetes management tools.

According to an example, Intelligent Cloud Operations (ICOs) are applied that automatically analyze large amounts of usage pattern data (O-data) as well as experience data (X-data). In response, the system can trigger corresponding actions such as:
 start up,
 shut down,
 suspend,
 restart,
 shrink,
 expand,
 install,
 deinstall, and
 move software solutions (e.g., between different cloud providers with zero or near zero downtime).

One side effect of the "move" action, is the ability to avoid a vendor lock-in. That is, a software solution is not tied to a single cloud provider, and instead can shift between such cloud providers—e.g., to obtain the (computational, storage, network) resources for the least cost. Avoiding vendor lock-in can also prove beneficial in relation to concerns arising from security and/or data protection.

Figure 3:
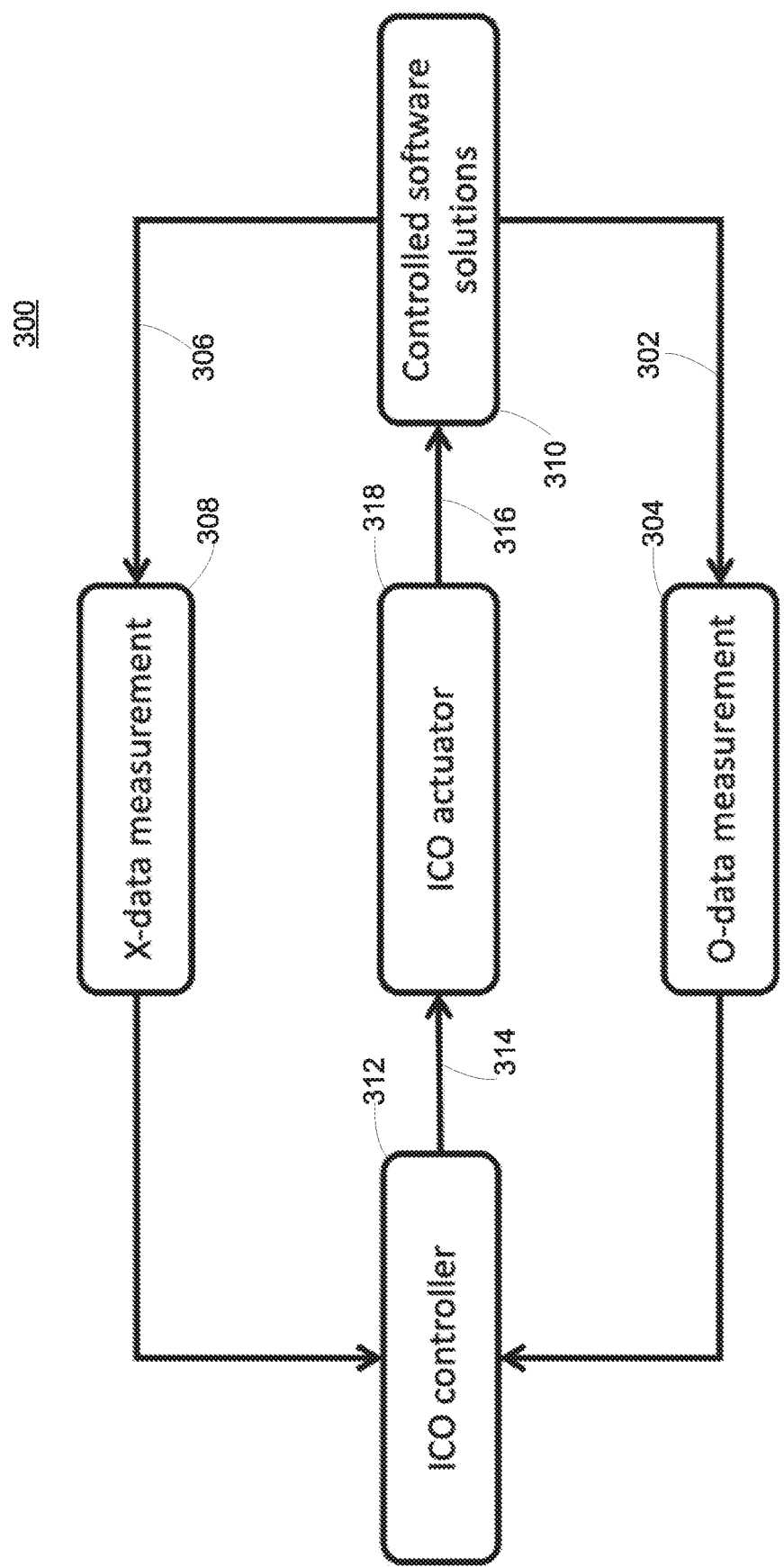
FIG. 3 depicts a simplified architecture of an embodiment of an intelligent cloud control application according to a specific example.

The diagram of FIG. 3 offers a high-level overview 300 showing Intelligent Cloud Operations (ICO) as may be performed according to an example.

The process starts with collection 302 of O-data 304 and the collection 306 of X-data 308 from a controlled software solution 310. This data flows to the ICO controller 312.

The ICO controller triggers 314 corresponding actions 316 via the ICO actuator 318. These ICO actuator actions impact the controlled software solutions.

For a certain period of time, X-data and O-data is measured again, and the results flow to the ICO controller which in turn triggers actions via the ICO actuator (or does nothing because a desired state has been reached).

This process is applied in an ongoing manner. Details regarding the different elements are now described below.

Measurement of O-data may occur as follows. A large volume of O-data is available for both:
 infrastructure resources (e.g., network, compute, storage),
 software solutions.

Given this data, it is possible to determine: which software solutions are used at any point in time, and the infrastructure needed for this operation. Such O-data may come mainly from monitoring and/or logging tools.

Often, gigabytes of O-data are produced per second just by logging tools. Such large volumes may be difficult to read and understand manually. Accordingly, inputs may be processed as follows.

1. Collect O-data and store it in a central location. For example, this can be done via a data lake—for which open source frameworks are available. An alternative is to use interfaces to logging and monitoring tools.

2. From the available O-data, focus upon specific information. For example, a procedure may first automatically separate mission critical software solutions from non-mission critical software solutions.

For non-mission critical software solutions (e.g. quality tests), the procedure may automatically detect software solutions that follow a strict schedule.

The procedure may also automatically identify software solutions that are used relatively infrequently, or that have not been used at all over a longer period of time.

The procedure may automatically detect how many users are needing a specific software solution at particular point(s) in time.

The procedure may automatically compare the real infrastructure consumption (network, compute, storage) with the allocated resources.

The procedure may automatically collect real infrastructure cost information concerning the current setup, and potential cost information from other cloud providers (hyperscalers).

Optionally, the procedure may automatically collect information concerning the carbon footprint of different cloud providers.

3. Using the focused O-data from step 2. above, embodiments may automatically predict the optimal usage of software solutions via machine learning (ML).

The measurement of X-data according to this example, is now described. X-data comes primarily from two main sources.

One part is automatically implicitly derived from specific O-Data. For example, lag time operational data indicating that a software user did not use the software after requesting it, could indicate that the delay in accessing the software was in fact too long.

The other part of X-data can be explicitly collected. Examples of such X-data collection are as follows.

X-data collection may involve automatically recording unplanned downtimes of software solutions and their affected users. Any unplanned downtime is considered to be a negative user experience. The number of affected users describes the impact.

Another approach for X-data collection may involve automatically recording lag time when users are interacting with the software solution. Lag time can have various reasons like for example limited network bandwidth or time to bring a software solution online. Lag times that are above a certain threshold are automatically considered to be a negative user experience. The number of affected users again describes the impact.

Still another approach for X-data collection involves automatically asking users for feedback from time to time after having used a specific software solution. The number of survey participants and the corresponding feedback clusters describe the impact. As an incentive to provide feedback, a feedback counter could be established (e.g., X % of all users are happy/unhappy with provided solution), together with an information about the planned next steps in case of a necessary improvement.

Details regarding the ICO controller are now provided. The command variable for the ICO controller is overall cost, and optionally the carbon footprint. Having both O-data and X-data available as described above, the ICO Controller can trigger intelligent cloud operations.

One example of an intelligent cloud operation could be to switch off non-mission critical software solutions completely during non-working hours. Another example of an intelligent cloud operation could be to automatically switch on non-mission critical software solutions according to an automatically detected, regular schedule.

Still another example of an ICO could be to automatically uninstall software solutions that haven't been used for a long time. Yet another example of an ICO may be to automatically provision software solutions based on user login data.

Another example of an ICO may be to automatically shrink mission critical software solutions during idle hours (e.g., lunch time, vacation, retreats, all-hands meetings).

Another example of an ICO may continuously and/or automatically adjust the real infrastructure consumption to the needed infrastructure via automatic de-provisioning. Yet another example of an ICO may move from one cloud provider to another based upon considerations such as current prices and/or carbon footprint.

An ICO may automatically provide a more robust and resilient infrastructure if needed, based upon unplanned downtimes (e.g., public emergencies). Still another ICO may adjust the infrastructure based on experienced lag times or corresponding survey feedback.

Details regarding the ICO actuator of FIG. 3, are now described. The ICO actuator provides basic operations, examples of which can include but are not limited to the following.

1. Start up/shut down. Here, software solutions are started or stopped, comparable to the start up and shut down of an operating system. As compared to suspend/restart (below), this is a comparatively slow process but does not require additional persistent storage.

2. Suspend/restart. According to these operations, the main memory content of a software solution is stored on persistent storage. Restart results in the persistent storage being read, and the content put back into main memory.

3. Shrink/expn. Shrink has different options. If the software solution runs in a classic cluster setup (with one central instance and many dialog instances), shrinking involves the removal of some dialog instances. If the software runs in Docker/Kubernetes environment, shrinking involves the removal of some containers providing the same service. If the software runs in a virtual machine (VM) environment, shrinking involves the removal of virtual infrastructure components. Expansion is basically the opposite of the shrink options.

4. Install/deinstall. These operations are mostly used for software solutions that are unused over a longer period.

5. Move. Here, the move operation involves relocating from one cloud provider to another, with zero or near-zero downtime. Near-zero downtime results in a short downtime, which is usually not perceived by the user. It could be accomplished using low demand times (weekends, evenings) for the move. Alternatively, near-zero downtime can be achieved via moving one piece of the software solution after the other. A zero downtime move results in the software solution being relocated without the need of a shut down period. This can be achieved, for example, via using the life migration features of a VM environment, or via using a High Availability (HA) setup to perform a seamless switch.

Figure 4:
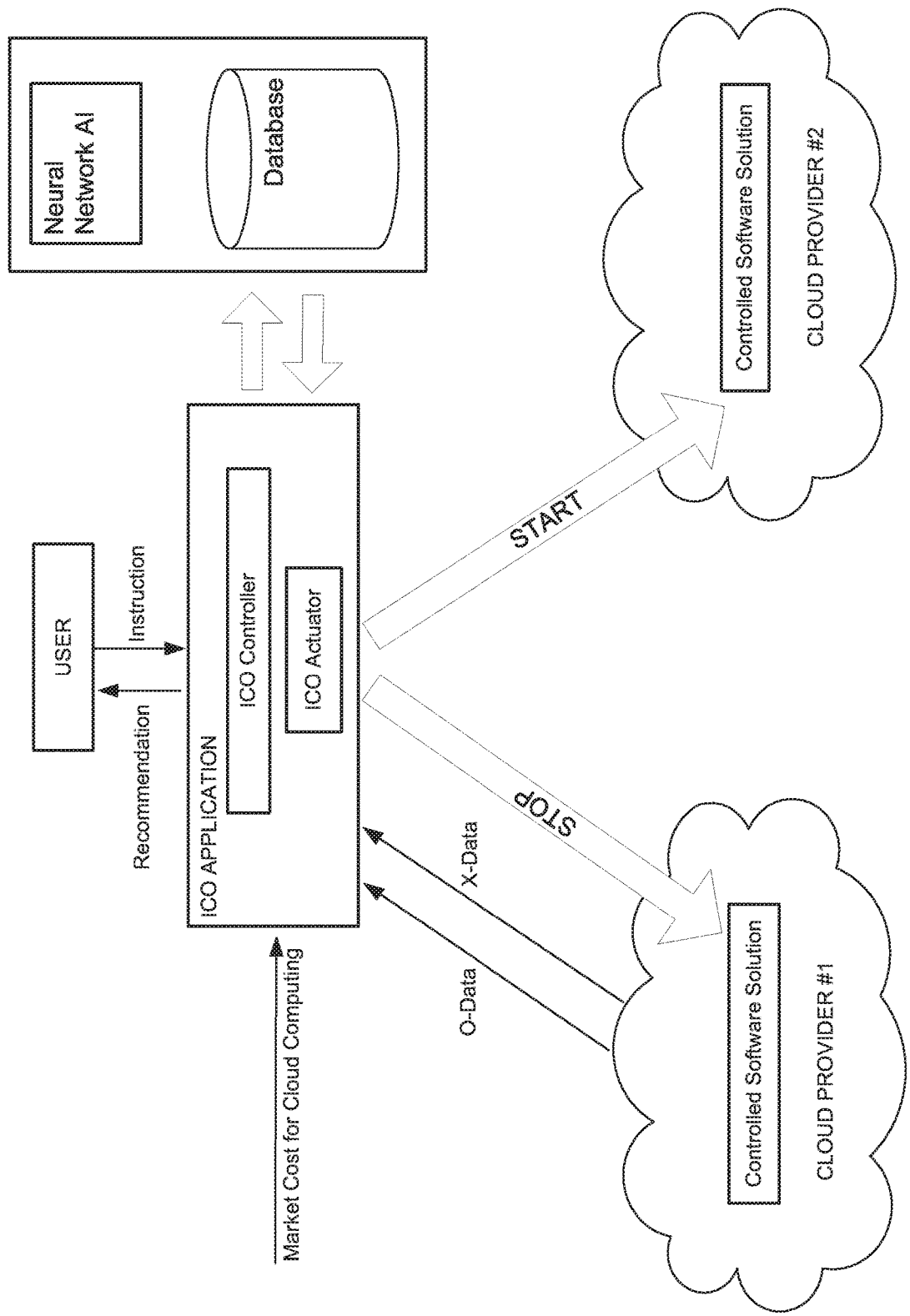
FIG. 4 depicts an exemplary cloud control application in one mode of operation.

Specifically, FIG. 4 shows a simplified example where a controlled software solution is utilizing the cloud computing resources provided by a particular Cloud Provider #1 (e.g., Google Cloud Services). A processor of an application according to an embodiment, receives the following inputs:

O-Data from the software solution running on Cloud Provider #1; and

X-Data from the software solution running on Cloud Provider #1.

Based upon these inputs, the ICO references data stored in the data layer, and generates a recommendation to save cost. The ICO communicates to the user, the recommendation to have the application migrate the operation of the software solution from Cloud Provider #1, to a different Cloud Provider #2 (e.g., AZURE available from Amazon) in order to save costs.

The user of the application agrees with the recommendation, and returns an instruction to the ICO. Then, ICO actuator(s) cause the software solution to stop running on the Cloud Provider #1, and to commence running on the Cloud Provider #2.

While FIG. 4 shows actions being taken by the ICO controller in response to user acceptance of a recommendation, this is not required. Various embodiments could automatically implement intelligent control via actions automatically taken by the ICO in response to receiving certain inputs and referencing particular data.

It is noted that software stopping and starting processes (e.g., as part of coordinated move action), could be performed in a seamless and transparent manner. One possibility is to leverage techniques and strategies utilized in HA processing, where resources are selectively distributed within a single Cloud Provider and accessed in a manner that ensures the failure of individual (hardware, software) components does not compromise the availability of the entire controlled software solution.

Returning now to FIG. 1, there the particular embodiment is depicted with the engine responsible for implementing intelligent operation of a cloud system as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 5:
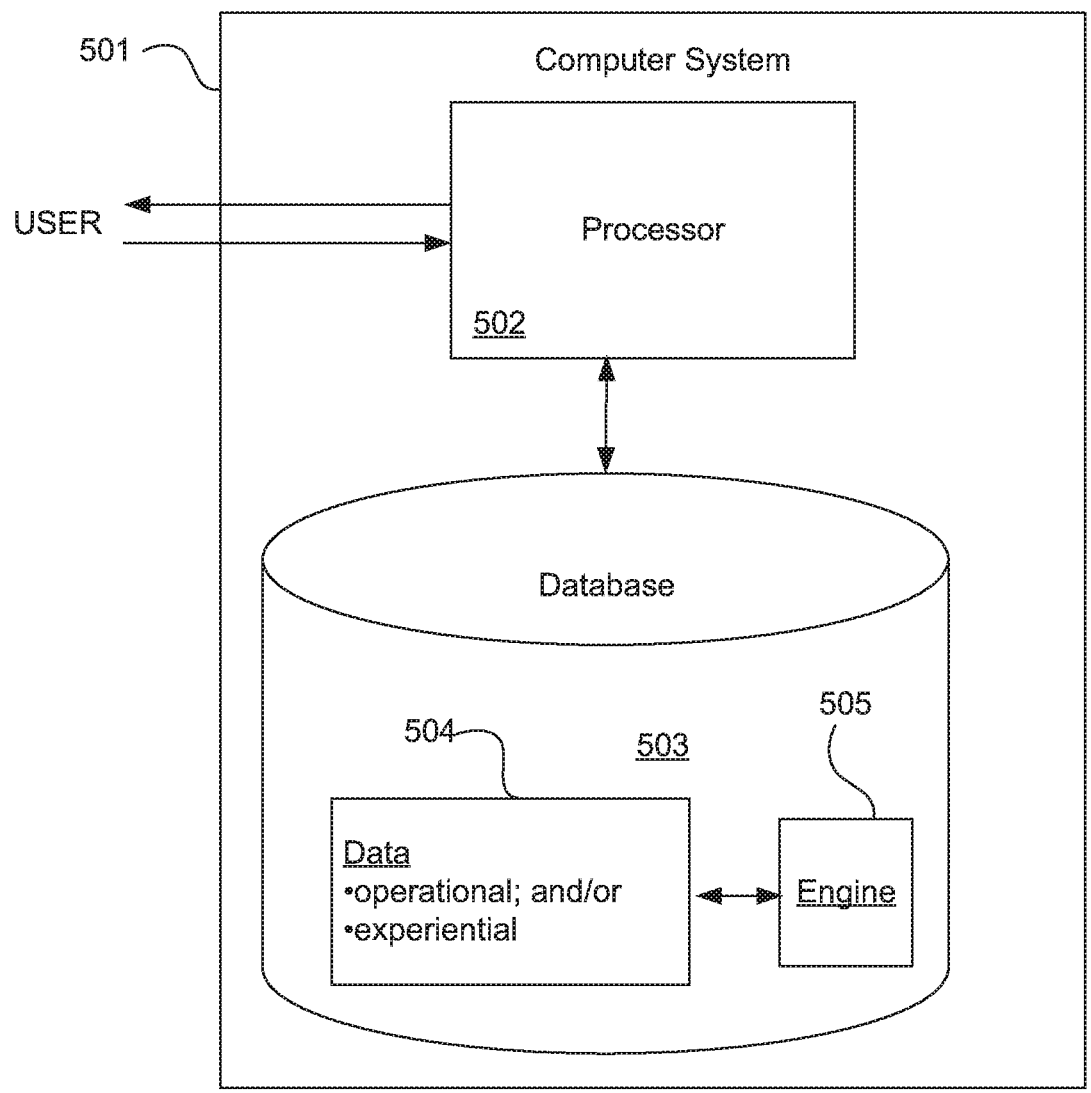
FIG. 5 illustrates hardware of a special purpose computing machine according to an embodiment that is configured to implement control of a cloud system.

Thus FIG. 5 illustrates hardware of a special purpose computing machine configured to implement intelligent operation of a cloud system according to an embodiment. In particular, computer system 501 comprises a processor 502 that is in electronic communication with a non-transitory computer-readable storage medium comprising a database 503. This computer-readable storage medium has stored thereon code 505 corresponding to an engine. Code 504 corresponds to data, for example operational and/or experience data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
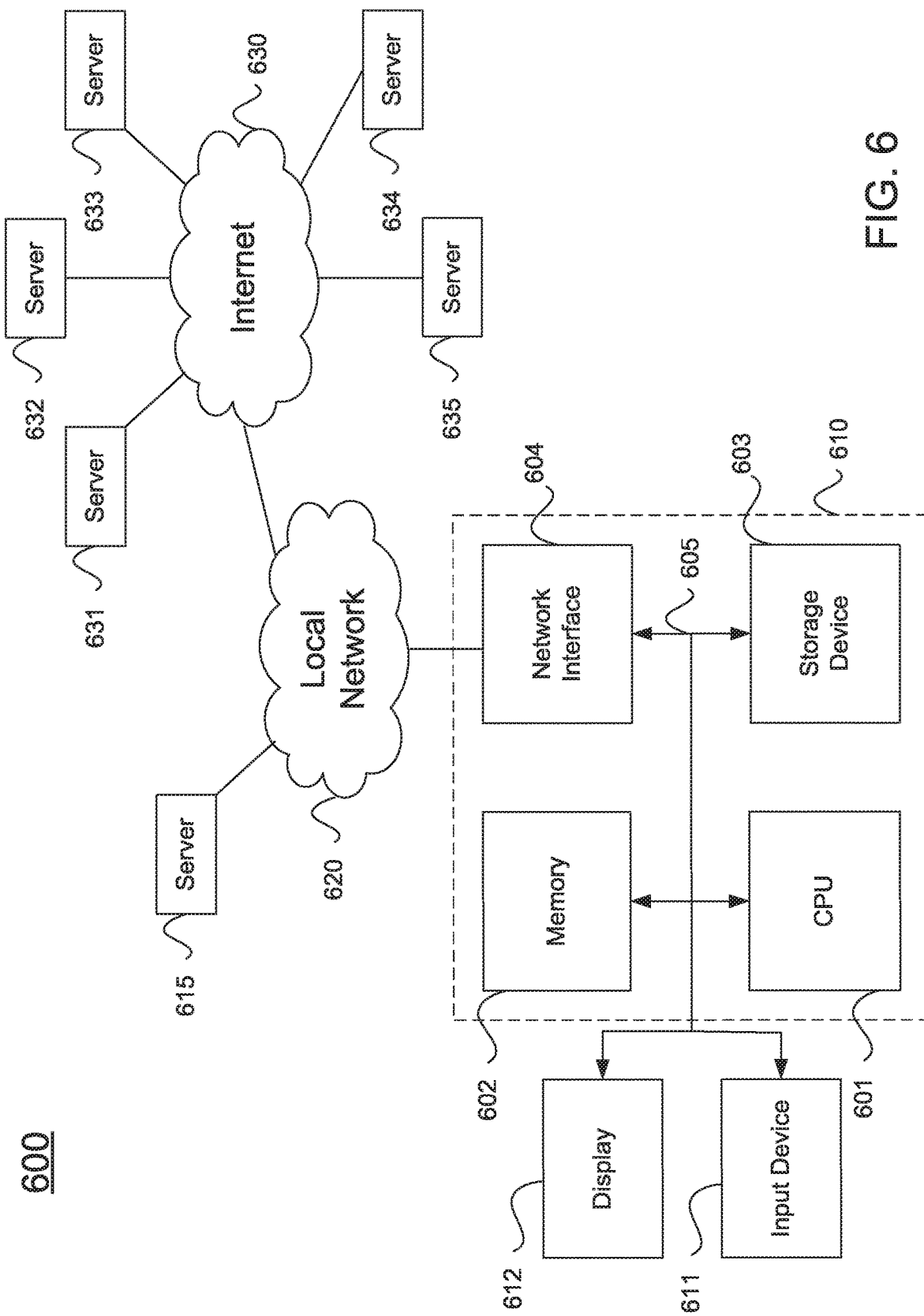
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving from software hosted on a first provider system, operational data specifying,
a time, and
a user requesting a component of the software at the time,
storing the operational data in a database or in a neural network Artificial Intelligence (AI);
receiving experiential data reflecting a quality of a user interaction with the software at the time, the experiential data derived from the operational data to indicate that the user did not use the software;
storing the experiential data in the database;
processing the operational data and the experiential data according to a data layer to issue a query to the database or the neural network (AI);
receiving from the data layer or the neural network (AI) in response to the query, a query result including a cost value; and
based upon the query result, issuing a command to cause an actuator to perform an action upon the software.

2. A method as in claim 1 wherein the operational data reflects consumption of resources at the first provider system by the software, the resources selected from at least one of storage resources, computational resources, and network resources.

3. A method as in claim 1 wherein the processing further considers a market value for the resources.

4. A method as in claim 1 wherein the command causes the software to move from the first provider system to a second provider system as part of a cloud provider switch service.

5. A method as in claim 1 wherein the experiential data comprises a response to a user inquiry regarding the quality of the user interaction.

6. A method as in claim 1 wherein:
the operational data indicates a reduced demand period; and
the action comprises suspending, shutting down, or shrinking the software.

7. A method as in claim 1 wherein the query result comprises carbon footprint data.

8. A method as in claim 1 wherein:
the data layer comprises an in-memory database; and
the processing and the issuing are performed by an in-memory database engine of the in-memory database.

9. A non-transitory computer readable storage medium embodying a computer program for performing a method, said method comprising:
receiving from software hosted on a first provider system, operational data specifying,
a time, and
a user requesting a component of the software at the time,
storing the operational data in a database;

receiving experiential data reflecting a quality of a user interaction with the software at the time, the experiential data derived from the operational data to indicate that the user did not use the software;

storing the experiential data in the database;

processing the operational data and the experiential data according to a data layer to issue a query to the database;

receiving from the database in response to the query, a query result including a cost value; and based upon the query result, issuing a command to cause an actuator to perform an action upon the software, wherein the command causes the software to move from the first provider system to a second provider system as part of a cloud provider switch service.

10. A non-transitory computer readable storage medium as in claim 9 wherein the operational data reflects consumption of resources at the first provider system by the software, the resources selected from at least one of storage resources, computational resources, and network resources.

11. A non-transitory computer readable storage medium as in claim 9 wherein the processing further considers a market value for the resources.

12. A non-transitory computer readable storage medium as in claim 9 wherein the experiential data comprises a response to a user inquiry regarding the quality of the user interaction.

13. A non-transitory computer readable storage medium as in claim 9 wherein:

the operational data indicates a reduced demand period; and the action comprises suspending, shutting down, or shrinking the software.

14. A computer system comprising:

one or more processors;

a software program, executable on said computer system, the software program configured to cause an in-memory database engine of an in-memory source database to:

receive from software hosted on a first provider system, operational data specifying, a time, and a user requesting a component of the software at the time, store the operational data in the in-memory database;

receive experiential data reflecting a quality of a user interaction with the software at the time, the experiential data derived from the operational data to indicate that the user did not use the software;

store the experiential data in the in-memory database;

process the operational data and the experiential data according to a ruleset of a data layer to issue a query to the in-memory database;

receive from the in-memory database in response to the query, a query result including a cost value; and based upon the query result, issuing a command to cause an actuator to perform an action upon the software.

15. A computer system as in claim 14 wherein:

in performing the processing, the in-memory database engine further considers a market value for resources consumed by the software at the first provider system.

16. A computer system as in claim 14 wherein the command causes the software to move from the first provider system to a second provider system as part of a cloud provider switch service.

17. A computer system as in claim 14 wherein:

the operational data indicates a reduced demand period; and the action comprises suspending, shutting down, or shrinking the software.

18. A computer system as in claim 14 wherein the experiential data comprises a response to a user inquiry regarding the quality of the user interaction.

* * * * *